(12) United States Patent
Nagai

(10) Patent No.: US 9,767,374 B2
(45) Date of Patent: Sep. 19, 2017

(54) DRIVER CHECK APPARATUS

(71) Applicant: DENSO CORPORATION, Kariya, Aichi-pref. (JP)

(72) Inventor: Fumiya Nagai, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 14 days.

(21) Appl. No.: 14/892,447

(22) PCT Filed: Apr. 7, 2014

(86) PCT No.: PCT/JP2014/001981
§ 371 (c)(1),
(2) Date: Nov. 19, 2015

(87) PCT Pub. No.: WO2014/188648
PCT Pub. Date: Nov. 27, 2014

(65) Prior Publication Data
US 2016/0171319 A1    Jun. 16, 2016

(30) Foreign Application Priority Data
May 21, 2013   (JP) .................. 2013-107117

(51) Int. Cl.
*G06K 9/00*   (2006.01)
*G06T 7/00*   (2017.01)
(Continued)

(52) U.S. Cl.
CPC ......... *G06K 9/00845* (2013.01); *B60W 40/08* (2013.01); *G06K 9/00* (2013.01);
(Continued)

(58) Field of Classification Search
CPC .. G06K 9/00; G06K 9/00604; G06K 9/00845; G06K 9/00255; G06T 7/74;
(Continued)

(56) References Cited

U.S. PATENT DOCUMENTS 7,021,779 B1 * 4/2006 Goosens .................. B60R 1/08
359/862
2006/0195241 A1   8/2006 Nakagoshi
(Continued)

FOREIGN PATENT DOCUMENTS

JP    H05-300601 A   11/1993
JP    H08-178712 A    7/1996
(Continued)

OTHER PUBLICATIONS

English Translation of JP2009-176112A.*
(Continued)

*Primary Examiner* — Jon Chang
(74) *Attorney, Agent, or Firm* — Knobbe, Martens, Olson & Bear, LLP

(57) ABSTRACT

A driver check apparatus includes: a face image acquisition portion that obtains a face image of a driver in a vehicle; an extraction portion that extracts a face orientation and/or a sight direction of the driver, based on the face image obtained by the face image acquisition portion while the vehicle is stopped; and a first determination portion that determines whether the face orientation and/or the sight direction extracted by the extraction portion is within a predetermined visual recognition range in which a passenger in the vehicle is visually recognized.

15 Claims, 6 Drawing Sheets

(51) Int. Cl.
*B60W 40/08* (2012.01)
*G06T 7/73* (2017.01)

(52) U.S. Cl.
CPC ..... *G06K 9/00255* (2013.01); *G06K 9/00604* (2013.01); *G06T 7/74* (2017.01); *G06T 2207/30201* (2013.01); *G06T 2207/30268* (2013.01)

(58) Field of Classification Search
CPC .......... G06T 2207/30201; G06T 2207/30268; B60W 40/08
See application file for complete search history.

(56) References Cited

U.S. PATENT DOCUMENTS

| 2007/0076958 | A1* | 4/2007 | Venkatesh | G06K 9/00604 382/218 |
| 2012/0056734 | A1 | 3/2012 | Ikeda et al. | |
| 2014/0204193 | A1* | 7/2014 | Zhang | G06K 9/00597 348/78 |
| 2014/0249717 | A1* | 9/2014 | Takahashi | B60R 21/00 701/36 |

FOREIGN PATENT DOCUMENTS

| JP | 2000-071876 A | | 3/2000 |
| JP | 2002-172978 A | | 6/2002 |
| JP | 2008-021177 A | | 1/2008 |
| JP | 2008-040977 A | | 2/2008 |
| JP | 2008-097278 A | | 4/2008 |
| JP | 2009176112 A | * | 8/2009 |
| JP | 2010-149767 A | | 7/2010 |
| JP | 2012-054664 A | | 3/2012 |
| JP | 2012-247871 A | | 12/2012 |
| WO | 2014/188648 A1 | | 11/2014 |

OTHER PUBLICATIONS

International Search Report and Written Opinion mailed on Jun. 10, 2014 for the International Application No. PCT/JP2014/001981.

* cited by examiner $$S = \sum_{i=1}^{n} \varepsilon \Delta t_i$$

DRIVER CHECK APPARATUS

CROSS REFERENCE TO RELATED APPLICATIONS

This application is based on Japanese Patent Application No. 2013-107117 filed on May 21, 2013, the disclosure of which is incorporated herein by reference.

TECHNICAL FIELD

The present disclosure relates to a driver check apparatus.

BACKGROUND ART

When a route bus has departed, a passenger who is not seated and does not hold a hand rail or a strap may fall down. Regarding an accident of a bus, there are more cases of falling accidents of a passenger than there are cases of accidents with respect to a vehicle or a pedestrian.

Patent literature 1 discloses a technology for suppressing a falling accident of passengers by determining whether the passenger is seated, and by adjusting a state of traveling of the bus in accordance with the determination result.

The inventor of the present disclosure has found that it may be difficult to sufficiently reduce the falling accidents of passengers even when a traveling state of a bus is adjusted as described in patent literature 1 if a vehicle departs when a passenger who is not seated and does not hold the hand rail or the strap is present.

PRIOR ART DOCUMENT

Patent Document

Patent literature 1: JP 2010-149767A

SUMMARY OF THE INVENTION

It is an object of the present disclosure to provide a driver check apparatus that improves safety of the vehicle.

According to one embodiment of the present disclosure, a driver check apparatus includes a face image acquisition portion, an extraction portion, and a first determination portion. The face image acquisition portion obtains a face image of a driver in a vehicle. The extraction portion extracts a face orientation and/or a sight direction of the driver, based on the face image obtained by the face image acquisition portion while the vehicle is stopped. The first determination portion determines whether the face orientation and/or the sight direction extracted by the extraction portion is within a predetermined visual recognition range in which a passenger in the vehicle is visually recognized.

According to the driver check apparatus of the present disclosure, it may be possible to determine whether the face orientation and/or the sight direction of the driver while the vehicle is stopped is within a visual recognition range. In other words, it may be possible to determine whether the driver confirms a state of the passenger while the vehicle is stopped.

Thus, according to the driver check apparatus of the present disclosure, since it may be possible to detect a case where the driver is about to start the vehicle without confirming a state of the passenger while the vehicle is stopped, a safety of the bus is improved.

BRIEF DESCRIPTION OF THE DRAWINGS

The above and other aspects, features and advantages of the present disclosure will become more apparent from the following detailed description made with reference to the accompanying drawings. In the drawings.

PREFERRED EMBODIMENTS FOR CARRYING OUT THE INVENTION

Figure 1:
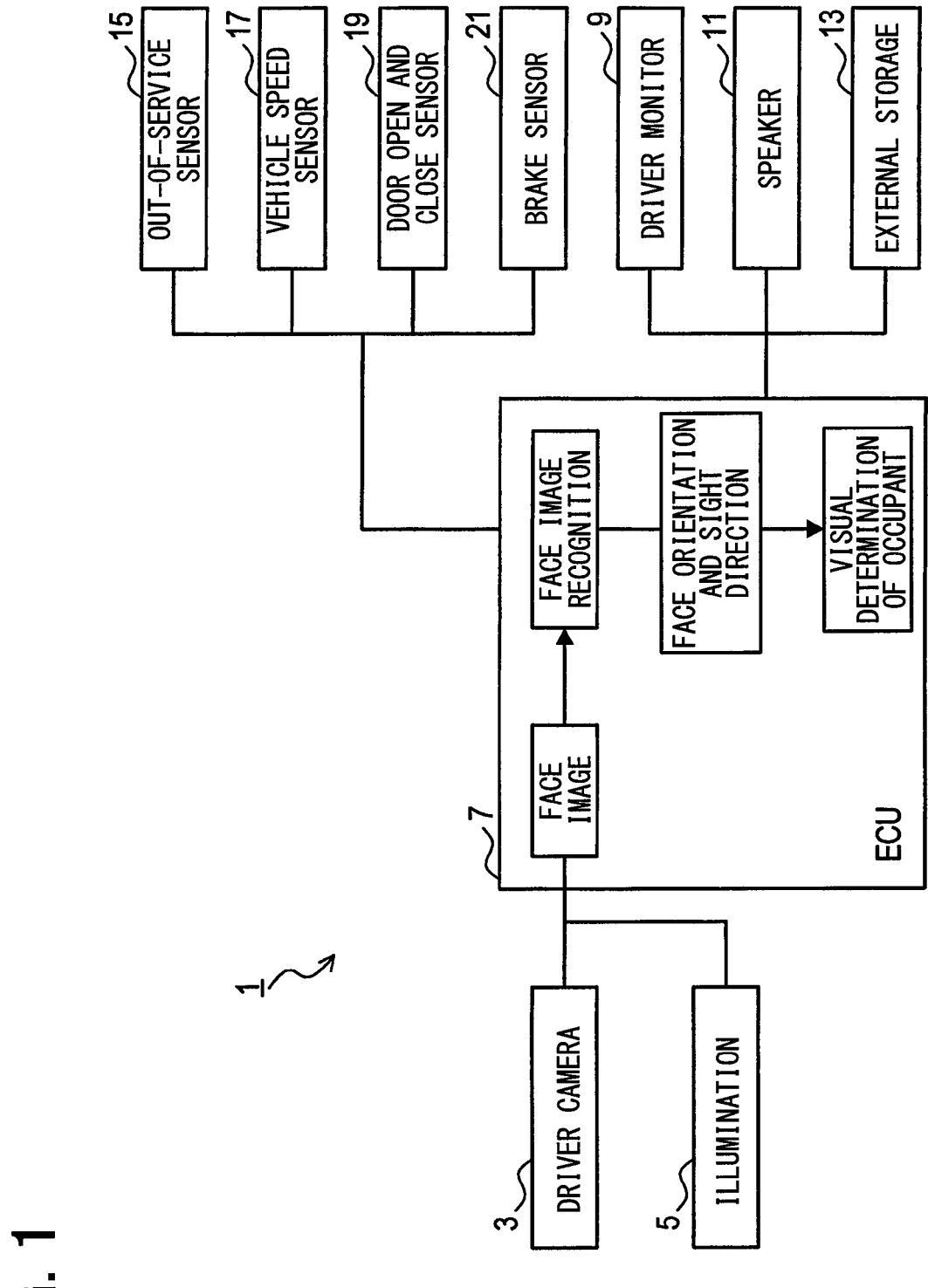
FIG. 1 is a block diagram illustrating a configuration of a driver check apparatus.

An embodiment of the present disclosure will be described with referring to the drawings.

1. Configuration of a Driver Check Apparatus 1

A configuration of a driver check apparatus 1 will be described with referring to FIG. 1 and FIG. 2. The driver check apparatus 1 is an onboard device that is mounted to a bus. As illustrated in FIG. 1, the driver check apparatus 1 includes a driver camera 3, an illumination 5, an ECU 7, a driver monitor 9, a speaker 11, an external storage device 13, an out-of-service sensor 15, a vehicle speed sensor 17, a door open and close sensor 19, and a brake sensor 21. Incidentally, a bus corresponds to an embodiment of a vehicle.

Figure 2:
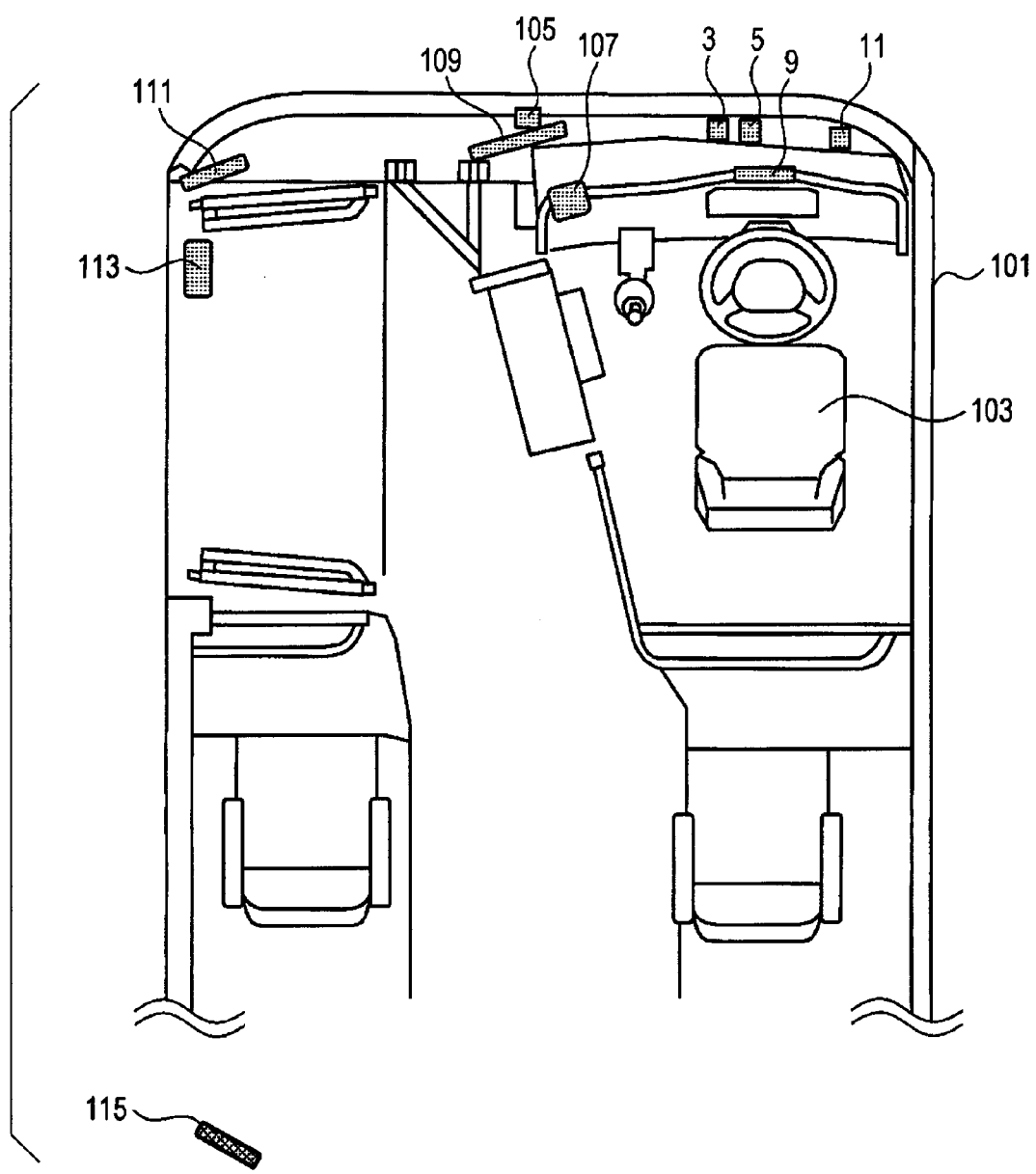
FIG. 2 is a diagram illustrating arrangement of each configuration element in a bus.
Figure 3:
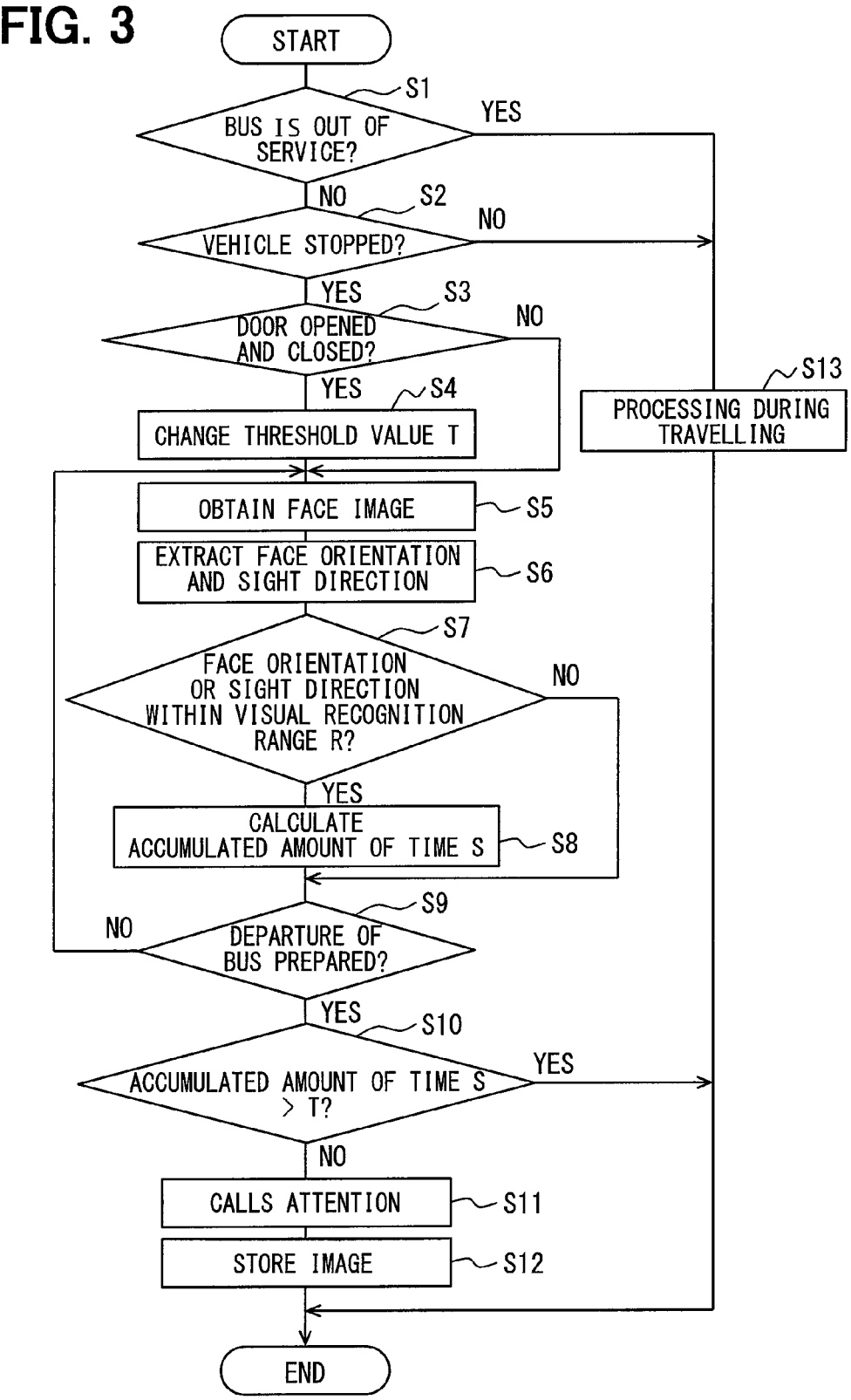
FIG. 3 is a flowchart illustrating processing performed by the driver check apparatus.

As illustrated in FIG. 2, the driver camera 3 is installed in front of a driver seat 103 in a bus 101. The driver camera 3 images a face of a driver and obtains a face image of the driver. The driver camera 3 outputs the obtained face image to the ECU 7.

The illumination 5 is installed at a position adjacent to the driver camera 3, and irradiates the face of the driver with light. The face of the driver is imaged by the illumination 5 even when illumination is low. The ECU 7 is configured of a known computer, and performs processing that is described later. In other words, the ECU 7 has a function to receive the face image obtained by the driver camera 3, a function to recognize the face image by a known image recognizing method, a function to extract a face orientation and a sight direction of the driver, and a function to perform a visual determination of a passenger. Incidentally, the visual determination of the passenger indicates determining whether a face orientation or a sight direction of a driver is within a predetermined range. The detail of the visual determination will be described later.

As illustrated in FIG. 2, the driver monitor 9 is a monitor that is installed in front of the driver seat 103. The driver monitor 9 displays various images for the driver. As illustrated in FIG. 2, the speaker 11 is installed in front of the driver seat 103. The speaker 11 outputs various sounds inside the bus 101.

The external storage device 13 is a storage device that includes a hard disk drive. The out-of-service sensor 15 is a sensor that detects ON/OFF of a display device (not shown) that, based on an operation of the driver, displays a state that the bus 101 is in an out of service. Incidentally, an ON state indicates that the state of being an out of service is displayed, and an OFF state indicates that the state of being an out of service is not displayed.

The vehicle speed sensor 17 is a sensor detecting a vehicle speed of the bus 101. The vehicle speed sensor 17 also detects that the bus 101 is stopped (that is, the vehicle speed is 0 km/h).

The door open and close sensor 19 is a sensor detecting the open and close of a door for a passenger who gets on and off the bus 101. The brake sensor 21 is a sensor detecting an operation state of a brake in the bus 101. The brake, which is a detection target of the brake sensor 21, may be any of a foot brake and a side brake. Incidentally, the brake corresponds to an embodiment of a braking device.

Incidentally, inside the bus 101, in addition to the driver check apparatus 1, an in-vehicle camera 105, an in-vehicle monitor 107, an in-vehicle confirmation mirror 109, a front entrance confirmation mirror 111, a front step confirmation mirror 113, and an intermediate entrance confirmation mirror 115 are provided as illustrated in FIG. 2.

The in-vehicle camera 105 is a camera imaging a range where seats for passengers are present. The in-vehicle monitor 107 is a monitor displaying an image imaged by the in-vehicle camera 105. The in-vehicle monitor 107 is positioned at a front left side of the driver seat 103. The driver can see the in-vehicle monitor 107 by facing the front left side.

From a viewpoint of the driver, the in-vehicle confirmation mirror 109 is a mirror reflecting the range in which the seats for passengers are present. The in-vehicle confirmation mirror 109 is positioned on a front left side of the driver seat 103. The driver can see the in-vehicle confirmation mirror 109 by facing the front left side.

When viewed from the viewpoint of the driver, the front entrance confirmation mirror 111 is a mirror reflecting the range in which the seats for passengers are present. The front entrance confirmation mirror 111 is positioned on a left side of the driver seat 103. The driver can see the front entrance confirmation mirror 111 by facing the left side.

When viewed from the viewpoint of the driver, the front step confirmation mirror 113 is a mirror reflecting a range that includes a front step in the bus 101. The front step confirmation mirror 113 is positioned on the left side of the driver seat 103. The driver can see the front step confirmation mirror 113 by facing the left side.

When viewed from the viewpoint of the driver, the intermediate entrance confirmation mirror 115 is a mirror reflecting a range that includes an intermediate entrance in the bus 101. The intermediate entrance confirmation mirror 115 is positioned on a rear left side of the driver seat 103. The driver can see the intermediate entrance confirmation mirror 115 by facing the rear left side.

Incidentally, the driver camera 3 corresponds to an embodiment of a face image acquisition portion (or means). The ECU 7 corresponds to an embodiment of an extraction portion (or means), a first determination portion (or means), a calculation portion (or means), and a second determination portion (or means). The driver monitor 9 and the speaker 11 correspond to embodiments of a notification portion (or means). The door open and close sensor 19 corresponds to an embodiment of a detection portion (or means).

These "portions" are determined by classifying the inside of the ECU 7 for convenience focusing on functions of the ECU 7, and do not mean that the inside of the ECU 7 is physically divided into parts that correspond to each of the "portions". Therefore, each of the "portions" may also be implemented in terms of software as a part of a computer program, and may also be implemented in terms of hardware by an IC chip or a large-scale integrated circuit.

2. Processing Performed by the Driver Check Apparatus 1

Processing repeatedly performed by the driver check apparatus 1 (particularly, the ECU 7) in each predetermined period of time will be described with referring to FIG. 3 to FIG. 7. In step 1 of FIG. 3, based on a detection signal of the out-of-service sensor 15, it is determined whether the bus 101 is in a state of being out of service (the state of being out of service is displayed). When the bus 101 is not in the state of being out of service, the processing shifts to step 2, and when the bus 101 is in the state of being out of service, the processing shifts to step 13.

In step 2, based on a detection signal of the vehicle speed sensor 17, it is determined whether the bus 101 is stopped. When the bus 101 is stopped, the processing shifts to step 3. When the bus 101 is not stopped (that is, traveling), the processing shifts to step 13.

In step 3, based on a detection signal of the door open and close sensor 19, it is determined whether the open and close of the door of the bus 101 is performed in a time from the moment when step 3 is performed before a predetermined time. When the open and close of the door is performed, the processing shifts to step 4, and when the open and close of the door is not performed, the processing shifts to step 5.

In step 4, a value of a threshold value T changes from $T_1$, which is a normal value, to $T_2$, which is a value greater than $T_1$. Incidentally, the threshold value T is a value used in step 10. In step 5, the face of the driver is imaged by using the driver camera 3, and the face image is obtained. At this time, the face of the driver is irradiated with the light by using the illumination 5. The obtained face image is output to the ECU 7.

Figure 4:
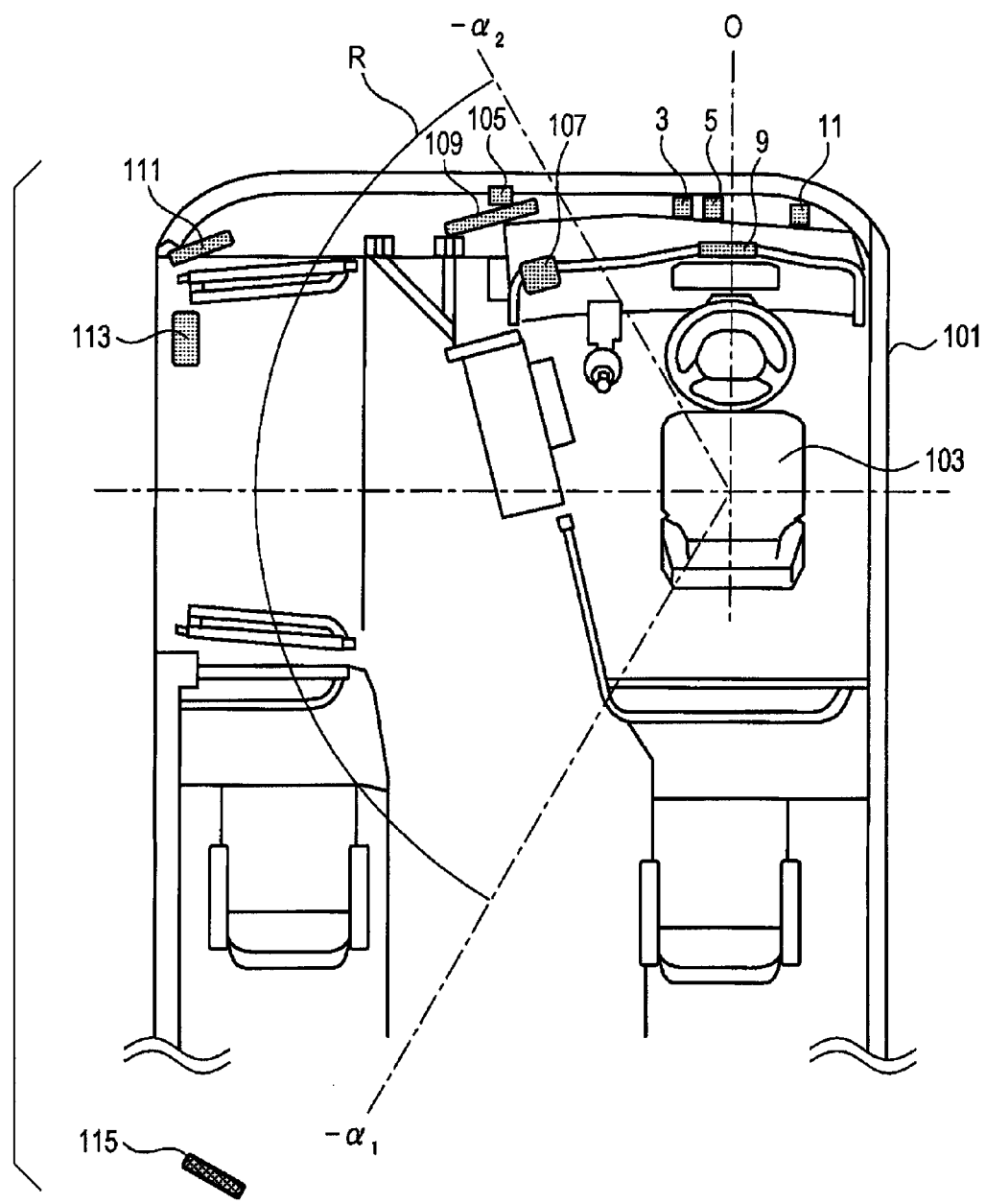
FIG. 4 is a diagram illustrating a visual recognition range R.

In step 6, a known image recognition processing is performed with respect to the face image obtained in step 5. A face orientation and a sight direction of the driver are extracted. In step 7, it is determined whether at least one of the face orientation of the driver and the sight direction of the driver extracted in step 6 is within a visual recognition range R illustrated in FIG. 4. FIG. 4 is a view when the bus 101 is viewed from above. In FIG. 4, a direction that faces frontward from the driver seat 103 is set to 0 degrees, and an angle of a clockwise direction around the driver seat 103 is defined as an angle r. The visual recognition range R corresponds to a range that the angle r is a range of $-\alpha_1$ to $-\alpha_2$. Here, it is 0 degrees $<\alpha_2<\alpha_1<180$ degrees.

In the visual recognition range R, the in-vehicle monitor 107, the in-vehicle confirmation mirror 109, the front entrance confirmation mirror 111, the front step confirmation mirror 113, and the intermediate entrance confirmation mirror 115 are included. In other words, the visual recognition range R is a predetermined range in which the driver can visually recognize the passenger in the bus 101.

Figures 5, 6:
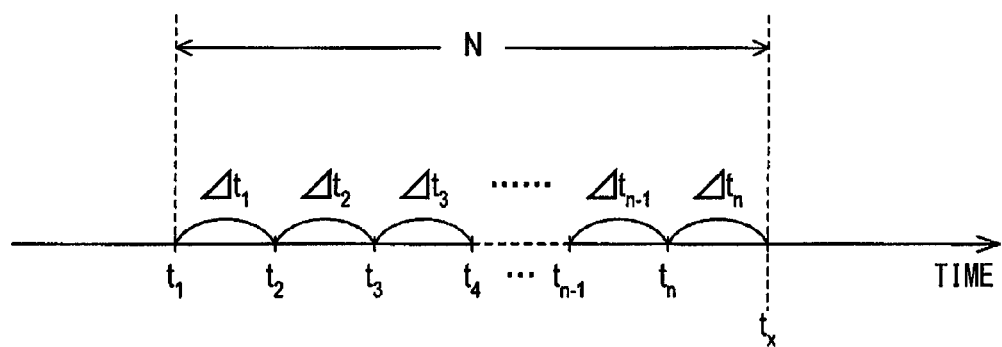
FIG. 5 is a diagram illustrating an accumulated amount of time S.
FIG. 6 is a diagram illustrating a method calculating the accumulated amount of time S.

In step 8, an accumulated amount of time S is calculated. The accumulated amount of time S is a time period when the face orientation or the sight direction of the driver is within the visual recognition range R for N seconds in the past. The accumulated amount of time S will be explained with referring to FIG. 5. A horizontal axis in FIG. 5 indicates time, and a right side of the axis indicates a later time. In FIG. 5, $t_x$ is a time when step 8 is performed. $t_1, t_2, t_3, \ldots t_n$ are respectively time when the processing of the step 7 is performed for N seconds going back from $t_x$. In addition, $\Delta t_i$ is time from $t_i$ to $t_{i+1}$ (i=1, 2, 3, ... n-1).

At the time $t_i$, when the face orientation or the sight direction of the driver is within the visual recognition range R (corresponds to a case where the determination result is positive in step 7), it is assumed that the face orientation or the sight direction of the driver is within the visual recognition range R during the period from $t_i$ to $t_{i+1}$ (that is, $\Delta t_i$). At the time $t_i$, when the face orientation and the sight direction of the driver is not within the visual recognition range R (corresponds to a case where the determination result is negative in step 7), it is assumed that the face orientation or the sight direction of the driver is not within the visual recognition range R during the period from $t_i$ to $t_{i+1}$ (that is, $\Delta t_i$).

In addition, by an equation in FIG. 6, for N seconds going back from $t_x$, the accumulated amount of time S that assumes that the face orientation or the sight direction of the driver is within the visual recognition range R is calculated. A value $\epsilon$ that is multiplied by $\Delta t_i$ in FIG. 6 is a variable that is equal to 1 when the result of the step 7 performed at the time $t_i$ is positive, and that is equal to 0 when the result is negative.

In step 9, based on a detection signal of the brake sensor 21, it is determined whether the brake is released (corresponds to whether a preparation for departure of the bus 101 is performed). When the brake is released, the processing shifts to step 10, and when the brake is not released, the processing shifts to step 5.

In step 10, it is determined whether the accumulated amount of time S calculated in step 8 is greater than the threshold value T. Incidentally, the value of the threshold value T is set to $T_2$ when the processing of step 4 has been performed, and is set to $T_1$ in other cases. When the accumulated amount of time S is equal to or less than the threshold value T, the processing shifts to step 11. When the accumulated amount of time S exceeds the threshold value T, the processing ends.

In step 11, a warning sound is generated by using the speaker 11, and a warning display that shows "did you confirm a passenger before departure?" is displayed on the driver monitor 9. Incidentally, the warning sound and the warning display are one embodiment of notification.

In step 12, the face image of the driver obtained while the bus 101 is stopped is stored in the external storage device 13. When the determination result is negative in step 1 or step 2, the processing shifts to step 13, and a processing during traveling is performed. An outline of the processing during the traveling will be described.

Similarly to step 5 and step 6, the face orientation and the sight direction of the driver are extracted. In addition, basically similarly to step 7 and step 8, an accumulated amount of time when the face orientation or the sight direction of the driver is within a predetermined visual recognition range U for N seconds in the past is calculated.

Figure 7:
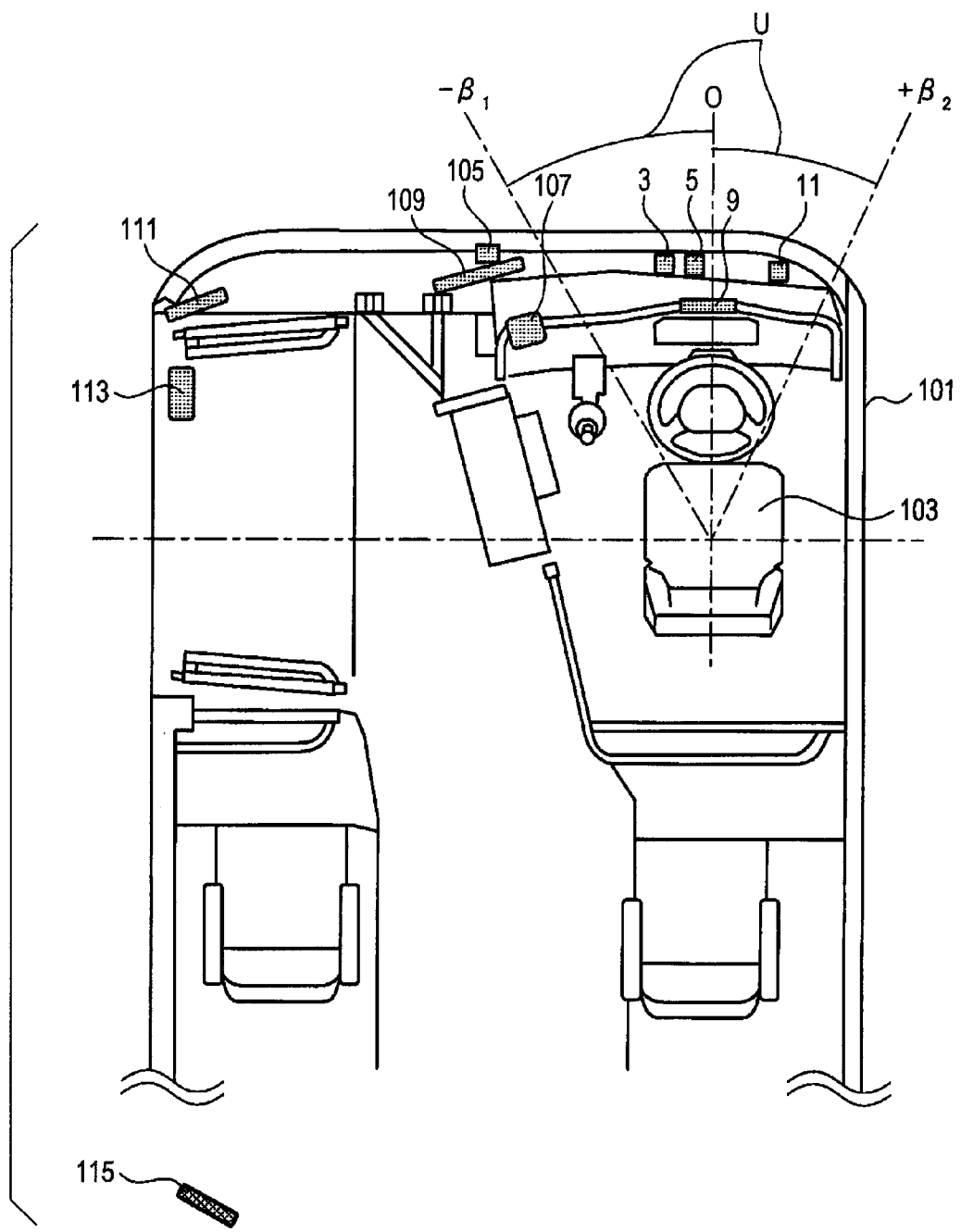
FIG. 7 is a diagram illustrating a visual recognition range U.

The visual recognition range U in this case is a range illustrated in FIG. 7, and the angle r is a range of $-\beta_1$ to $\beta_2$. Here, it is 0 degrees $<\beta_1<90$ degrees, and 0 degrees $<\beta_2<90$ degrees. The visual recognition range U is a range including the front side of the bus 101. In this range, the driver monitor 9 is included, but the in-vehicle monitor 107, the in-vehicle confirmation mirror 109, the front entrance confirmation mirror 111, the front step confirmation mirror 113, and the intermediate entrance confirmation mirror 115 are not included.

In the processing during the traveling, when the accumulated amount of time is equal to or less than a predetermined threshold value, a warning about inattentive driving is performed by using the speaker 11 and the driver monitor 9.

In addition, in the processing during the traveling, from the face image of the driver, by the known image recognizing method, a parameter (for example, an eye opening level of the eyes of the driver) that corresponds to the drowsiness of the driver is extracted. When drowsiness is detected, a warning about drowsy driving is performed by using the speaker 11 and the driver monitor 9.

3. Effect of the Driver Check Apparatus 1

(1) The driver check apparatus 1 determines whether the face orientation or the sight direction of the driver is within the visual recognition range R while the bus is stopped (that is, whether the driver confirms the state of a passenger while the bus is stopped). Thus, according to the driver check apparatus 1, since it may be possible to detect a state where the driver is about to start a bus without confirming the state of the passenger while the bus is stopped, it may be possible to improve safety of the bus 101.

(2) The driver check apparatus 1 determines whether the accumulated amount of time S exceeds the threshold value T, and calls for attention of the driver with respect to the driver when the accumulated amount of time S is equal to or less than threshold value T. Therefore, it may be possible to further improve safety of the bus 101.

(3) When the open and close of the door of the bus 101 is performed (when there is a possibility that a passenger who gets on or off the bus is present), the driver check apparatus 1 increases the value of the threshold value T, and makes the processing of step 11 and step 12 likely to be further performed. It may be possible to further improve safety of the bus 101.

(4) When the driver is about to start the bus without sufficiently confirming the state of the passenger while the bus is stopped, the driver check apparatus 1 stores the face image of the driver in the external storage device 13. It may be possible to use the face image of the driver in safe driving training for the driver.

(5) In a case of the state of being out of service, the driver check apparatus 1 does not perform the processing of step 2 to step 12. Thus, unnecessary processing may not be performed.

4. Modified Example (1) In step 6, the driver check apparatus 1 may extract only one of the face orientation and the sight direction of the driver. In addition, in step 8, it may be determined whether the one of the face orientation and the sight direction is within the visual recognition range R.

(2) In step 8, the accumulated amount of time S may be calculated by accumulating the time during which both of the face orientation and the sight direction of the driver are within the visual recognition range R.

(3) The value of the threshold value T may always be same irrespective of the detection signal of the door open and close sensor 19, (4) The driver check apparatus 1 may include a sensor (for example, a pressure sensor provided on a floor surface of the bus 101, or an infrared sensor provided on a wall surface of the bus 101) that directly detects the presence of the passenger who gets on or off the bus, instead of the door open and close sensor 19 or in addition to the door open and close sensor 19. In addition, when the sensor directly detects the passenger who gets on or off the bus, the determination result may be positive in step 3.

(5) In Step 8, not limiting to N seconds in the past, in the entire time zone during the bus is stopped, the accumulated amount of time during the face orientation or the sight direction of the driver is within the visual recognition range R may be calculated.

(6) The driver check apparatus 1 may be used in a vehicle (for example, a car or a truck) other than the bus.

(7) The visual recognition range R may not include the in-vehicle monitor 107, and may include the in-vehicle confirmation mirror 109, the front entrance confirmation mirror 111, the front step confirmation mirror 113, and the intermediate entrance confirmation mirror 115. In addition, the visual recognition range R may include the in-vehicle monitor 107, and may not include the in-vehicle confirmation mirror 109, the front entrance confirmation mirror 111, the front step confirmation mirror 113, and the intermediate entrance confirmation mirror 115.

The driver check apparatus according to one example of the present disclosure includes a face image acquisition portion that obtains the face image of the driver of the vehicle, the extraction portion that extracts the face orientation and/or the sight direction of the driver based on the face image obtained while the vehicle is stopped, and the first determination portion that determines whether the face orientation and/or the sight direction is within a predetermined visual recognition range in which the passenger in the vehicle can be visually recognized.

According to the driver check apparatus of one example of the present disclosure, it may be possible to determine whether the face orientation and/or the sight direction of the driver while the vehicle is stopped is within the visual recognition range. In other words, it may be possible to determine whether the driver confirms a state of the passenger during stop of the vehicle.

Thus, according to the driver check apparatus of one example of the present disclosure, since a case where the driver is about to start the vehicle without confirming the state of a passenger while the vehicle is stopped can be detected, it may be possible to improve safety of the vehicle.

The embodiment, the configuration, and the aspect of the present disclosure are exemplified, but the embodiment, the configuration, and the aspect according to the present disclosure are not limited to each of the embodiment, configuration, and aspect. For example, an embodiment, a configuration, and an aspect which are obtained by appropriately combining technical parts disclosed in each of different embodiment, configuration, and aspect are also included in the scope of the embodiment, the configuration, and the aspect according to the present disclosure.

The invention claimed is:

1. A driver check apparatus comprising:
a face image acquisition portion, using a processor, that obtains a face image of a driver in a vehicle;
an extraction portion, using the processor, that extracts a face orientation and/or a sight direction of the driver, based on the face image obtained by the face image acquisition portion while the vehicle is stopped;
a first determination portion, using the processor, that determines whether the face orientation and/or the sight direction extracted by the extraction portion is within a predetermined visual recognition range in which a passenger in the vehicle is visually recognized;
a calculation portion, using the processor, that calculates an accumulated amount of time during which the face orientation and/or the sight direction is within the visual recognition range, based on a determination result of the first determination portion;
a second determination portion, using the processor, that determines whether the accumulated amount of time calculated by the calculation portion exceeds a predetermined threshold value; and
a notification portion that performs notification, based on a determination result of the second determination portion.

2. The driver check apparatus according to claim 1, further comprising:
a detection portion, using the processor, that detects a presence or absence of a passenger who gets on or off the vehicle, and/or whether an open and close of a door of the vehicle is performed,
wherein:
the threshold value in a case where the passenger who gets on or off the vehicle is present or the open and close of the door is performed is greater than the threshold value in an other case.

3. The driver check apparatus according to claim 1, wherein:
the visual recognition range is a range that includes
a mirror reflecting the passenger when viewed from a viewpoint of the driver, and/or
a monitor displaying an image of a camera that images the passenger.

4. The driver check apparatus according to claim 1, wherein:
while the vehicle is stopped, the first determination portion determines whether the face orientation and/or the sight direction of the driver is within the predetermined visual recognition range in which the passenger in the vehicle is visually recognized.

5. The driver check apparatus according to claim 1, wherein:
when a braking device of the vehicle is released, the second determination portion determines whether the accumulated amount of time exceeds the predetermined threshold value.

6. A method for determining whether a passenger has been visually recognized by a driver of a vehicle:
obtaining a face image of the driver in the vehicle;
extracting a face orientation and/or a sight direction of the driver, based on the face image while the vehicle is stopped;
determining whether the face orientation and/or the sight direction is within a predetermined visual recognition range within which the passenger in the vehicle is visually recognized;
calculating an accumulated amount of time during which the face orientation and/or the sight direction is within the visual recognition range;
determining whether the accumulated amount of time exceeds a predetermined threshold value; and
notifying based on determining whether the accumulated amount of time exceeds the predetermined threshold value.

7. The method according to claim 6, further comprising:
detecting a presence or absence of a passenger who gets on or off the vehicle, and/or whether an open and close of a door of the vehicle is performed,
wherein:
the threshold value in a case where the passenger who gets on or off the vehicle is present or the open and close of the door is performed is greater than the threshold value in an other case.

8. The method according to claim 6, wherein:
the visual recognition range is a range that includes
a mirror reflecting the passenger when viewed from a viewpoint of the driver, and/or
a monitor displaying an image of a camera that images the passenger.

9. The method according to claim 6, further comprising:
determining, while the vehicle is stopped, whether the face orientation and/or the sight direction of the driver is within the predetermined visual recognition range in which the passenger in the vehicle is visually recognized.

10. The method according to claim 6, further comprising:
determining, when a braking device of the vehicle is released, whether the accumulated amount of time exceeds the predetermined threshold value.

11. A system for determining whether a passenger has been visually recognized by a driver of a vehicle:
an integrated circuit, comprising:
a processor configured to execute a set of computer-executable instructions that cause the processor to:
obtain a face image of the driver in the vehicle;
extract a face orientation and/or a sight direction of the driver, based on the face image while the vehicle is stopped;
determine whether the face orientation and/or the sight direction is within a predetermined visual recognition range within which the passenger in the vehicle is visually recognized;
calculate an accumulated amount of time during which the face orientation and/or the sight direction is within the visual recognition range;
determine whether the accumulated amount of time exceeds a predetermined threshold value; and
notify based on determining whether the accumulated amount of time exceeds the predetermined threshold value.

12. The system according to claim 11, the computer-executable instructions further causing the processor to:
detect a presence or absence of a passenger who gets on or off the vehicle, and/or whether an open and close of a door of the vehicle is performed,
wherein:
the threshold value in a case where the passenger who gets on or off the vehicle is present or the open and close of the door is performed is greater than the threshold value in an other case.

13. The system according to claim 11, wherein:
the visual recognition range is a range that includes
a mirror reflecting the passenger when viewed from a viewpoint of the driver, and/or
a monitor displaying an image of a camera that images the passenger.

14. The system according to claim 11, the computer-executable instructions further causing the processor to:
determine, while the vehicle is stopped, whether the face orientation and/or the sight direction of the driver is within the predetermined visual recognition range in which the passenger in the vehicle is visually recognized.

15. The system according to claim 11, the computer-executable instructions further causing the processor to:
determine, when a braking device of the vehicle is released, whether the accumulated amount of time exceeds the predetermined threshold value.

* * * * *